(12) United States Patent
Armangau et al.

(10) Patent No.: US 12,417,284 B2
(45) Date of Patent: Sep. 16, 2025

(54) SYSTEM AND METHOD FOR SOFTWARE-DEFINED NETWORK ATTACHED STORAGE (SDNAS) RANSOMWARE ATTACK DETECTION AND PREVENTION

(71) Applicant: Dell Products L.P., Round Rock, TX (US)

(72) Inventors: Philippe Armangau, Kalispells, MT (US); Vasudevan Subramanian, Chapel Hill, NC (US); Walter Forrester, Berkeley Heights, NJ (US)

(73) Assignee: Dell Products L.P., Round Rock, TX (US)

( * ) Notice: Subject to any disclaimer, the term of this patent is extended or adjusted under 35 U.S.C. 154(b) by 322 days.

(21) Appl. No.: 18/157,440

(22) Filed: Jan. 20, 2023

(65) Prior Publication Data

US 2024/0248989 A1    Jul. 25, 2024

(51) Int. Cl.
*G06F 21/56* (2013.01)
*G06F 21/55* (2013.01)

(52) U.S. Cl.
CPC .......... *G06F 21/565* (2013.01); *G06F 21/552* (2013.01); *G06F 2221/034* (2013.01)

(58) Field of Classification Search
CPC . G06F 21/565; G06F 21/552; G06F 2221/034
See application file for complete search history.

(56) References Cited

U.S. PATENT DOCUMENTS

| | | | |
|---|---|---|---|
| 11,170,104 B1* | 11/2021 | Stickle | G06N 20/00 |
| 2019/0108340 A1* | 4/2019 | Bedhapudi | G06F 21/554 |
| 2019/0236274 A1* | 8/2019 | Brenner | G06F 21/6245 |
| 2021/0152595 A1* | 5/2021 | Hansen | G06F 21/568 |
| 2022/0292196 A1* | 9/2022 | Bhagi | G06F 21/554 |
| 2024/0256458 A1* | 8/2024 | Subramanian | G06F 13/1668 |
| 2025/0053656 A1* | 2/2025 | Yu | G06F 21/567 |

FOREIGN PATENT DOCUMENTS

| | | | | |
|---|---|---|---|---|
| DE | 102020007114 A1 * | 5/2021 | | G06F 11/0727 |
| WO | WO-2022167790 A1 * | 8/2022 | | G06F 11/1448 |

* cited by examiner

*Primary Examiner* — Oleg Korsak
(74) *Attorney, Agent, or Firm* — Brian J. Colandreo; Heath M. Sargeant; Holland & Knight LLP

(57) ABSTRACT

A method, computer program product, and computing system for processing a plurality of operations on a storage object within a file storage system at a file level. The plurality of operations are monitored for at least a threshold number of file modification operations within the file storage system. In response to monitoring the at least a threshold number of file modification operations within the file storage system, file modification information associated with the at least a threshold number of file modification operations is provided to a block level of the file storage system. A potential ransomware attack on the file storage system is identified, at the block level, based upon, at least in part, the file modification information provided from the file level.

17 Claims, 6 Drawing Sheets

SYSTEM AND METHOD FOR SOFTWARE-DEFINED NETWORK ATTACHED STORAGE (SDNAS) RANSOMWARE ATTACK DETECTION AND PREVENTION

BACKGROUND

Storing and safeguarding electronic content may be beneficial in modern business and elsewhere. Accordingly, various methodologies may be employed to protect and distribute such electronic content.

Ransomware attacks are a primary security threat in today's world and are becoming more and more prevalent. Accurate detection is crucial, since a false negative is a failure to detect an ongoing ransomware attack, while a false positive indicates a false alarm which may cause users of a storage system to halt normal business operations and start a lengthy investigation process. There are different ransomware variants utilizing particular modes of operation (threats, tactics and procedures) which makes detecting a ransomware attack in general (i.e., a binary classification) more challenging, and detection of a specific type of attack (i.e., multi-class classification) even more challenging. Conventional approaches are focused on detection of ransomware attacks on a host, where the attack is occurring (i.e., where the ransomware is being executed). However, in an enterprise setting, the storage is typically separate from the host, using a file or block storage device or storage system. Detection of ransomware attacks on the storage system as opposed to the host poses a unique challenge since the storage system does not have direct access to information about the execution of the ransomware attack.

SUMMARY OF DISCLOSURE

In one example implementation, a computer-implemented method executed on a computing device may include, but is not limited to, processing a plurality of operations on a storage object within a file storage system at a file level. The plurality of operations are monitored for at least a threshold number of file modification operations within the file storage system. In response to monitoring the at least a threshold number of file modification operations within the file storage system, file modification information associated with the at least a threshold number of file modification operations is provided to a block level of the file storage system. A potential ransomware attack on the file storage system is identified, at the block level, based upon, at least in part, the file modification information provided from the file level.

One or more of the following example features may be included. The file storage system may be a Software-Defined Network Attached Storage (SDNAS) system. The file modification operations may include at least one of: a file rename operation; and a file deletion operation. A secure storage object may be generated using a snapshot associated with the storage object. A source of the potential ransomware attack on the file storage system may be identified based upon, at least in part, the file modification information. Identifying the source of the potential ransomware attack may include identifying one or more clients associated with the at least a threshold number of file modification operations. In response to identifying one or more clients associated with the at least a threshold number of file modification operations, a remedial action concerning the file storage system may be performed.

In another example implementation, a computer program product resides on a computer readable medium that has a plurality of instructions stored on it. When executed by a processor, the instructions cause the processor to perform operations that may include, but are not limited to, processing a plurality of operations on a storage object within a file storage system at a file level. The plurality of operations are monitored for at least a threshold number of file modification operations within the file storage system. In response to monitoring the at least a threshold number of file modification operations within the file storage system, file modification information associated with the at least a threshold number of file modification operations is provided to a block level of the file storage system. A potential ransomware attack on the file storage system is identified, at the block level, based upon, at least in part, the file modification information provided from the file level.

One or more of the following example features may be included. The file storage system may be a Software-Defined Network Attached Storage (SDNAS) system. The file modification operations may include at least one of: a file rename operation; and a file deletion operation. A secure storage object may be generated using a snapshot associated with the storage object. A source of the potential ransomware attack on the file storage system may be identified based upon, at least in part, the file modification information. Identifying the source of the potential ransomware attack may include identifying one or more clients associated with the at least a threshold number of file modification operations. In response to identifying one or more clients associated with the at least a threshold number of file modification operations, a remedial action concerning the file storage system may be performed.

In another example implementation, a computing system includes at least one processor and at least one memory architecture coupled with the at least one processor, wherein the at least one processor is configured to process a plurality of operations on a storage object within a file storage system at a file level. The plurality of operations are monitored for at least a threshold number of file modification operations within the file storage system. In response to monitoring the at least a threshold number of file modification operations within the file storage system, file modification information associated with the at least a threshold number of file modification operations is provided to a block level of the file storage system. A potential ransomware attack on the file storage system is identified, at the block level, based upon, at least in part, the file modification information provided from the file level.

One or more of the following example features may be included. The file storage system may be a Software-Defined Network Attached Storage (SDNAS) system. The file modification operations may include at least one of: a file rename operation; and a file deletion operation. A secure storage object may be generated using a snapshot associated with the storage object. A source of the potential ransomware attack on the file storage system may be identified based upon, at least in part, the file modification information. Identifying the source of the potential ransomware attack may include identifying one or more clients associated with the at least a threshold number of file modification operations. In response to identifying one or more clients associated with the at least a threshold number of file modification operations, a remedial action concerning the file storage system may be performed.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

BRIEF DESCRIPTION OF THE DRAWINGS

Like reference symbols in the various drawings indicate like elements.

DETAILED DESCRIPTION

Figure 1:
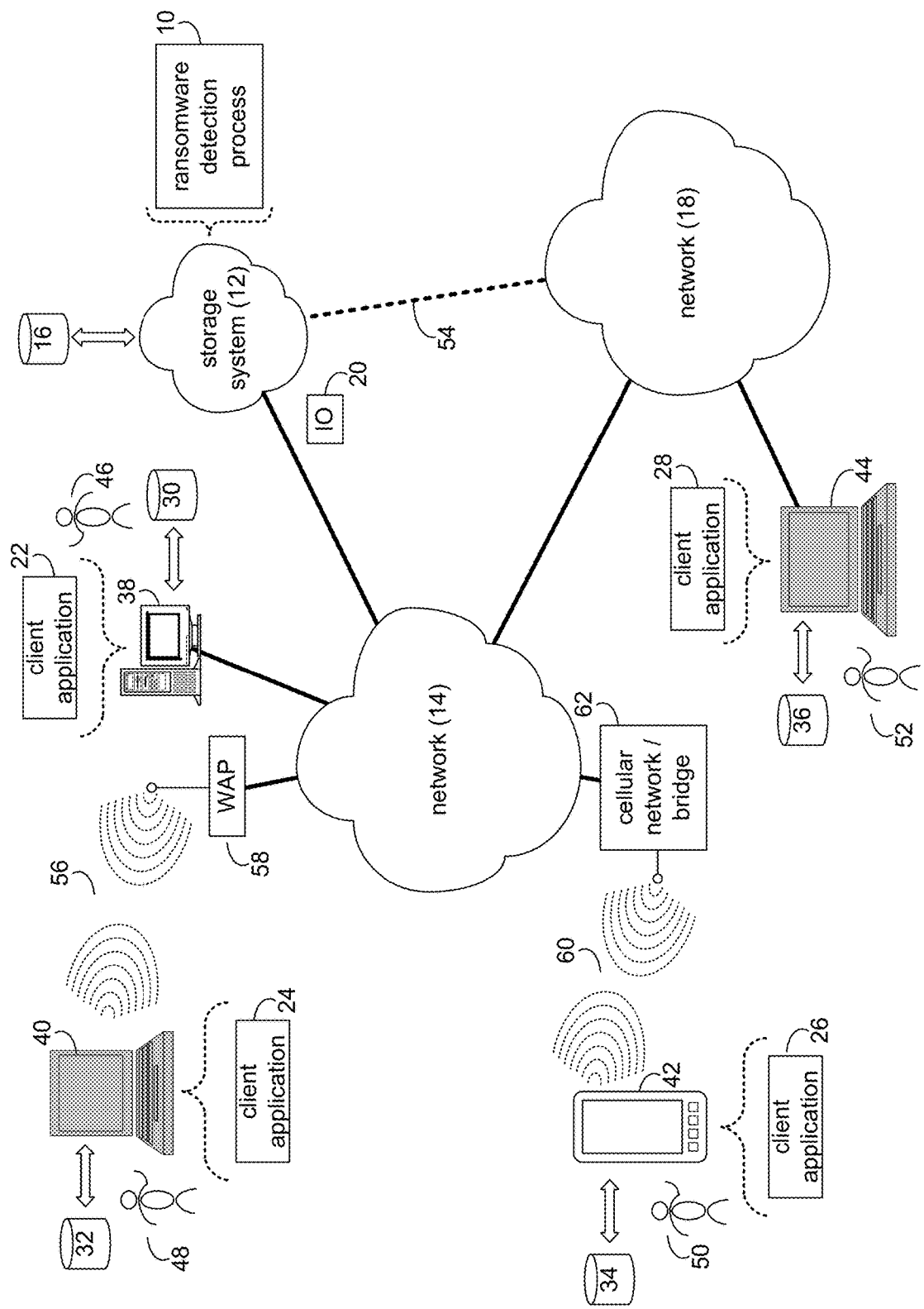
FIG. 1 is an example diagrammatic view of a storage system and a ransomware detection process coupled to a distributed computing network according to one or more example implementations of the disclosure.

System Overview:

Referring to FIG. 1, there is shown ransomware detection process 10 that may reside on and may be executed by storage system 12, which may be connected to network 14 (e.g., the Internet or a local area network). Examples of storage system 12 may include, but are not limited to: a Network Attached Storage (NAS) system, a Storage Area Network (SAN), a personal computer with a memory system, a server computer with a memory system, and a cloud-based device with a memory system.

As is known in the art, a SAN may include one or more of a personal computer, a server computer, a series of server computers, a mini computer, a mainframe computer, a RAID device and a NAS system. The various components of storage system 12 may execute one or more operating systems, examples of which may include but are not limited to: Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

The instruction sets and subroutines of ransomware detection process 10, which may be stored on storage device 16 included within storage system 12, may be executed by one or more processors (not shown) and one or more memory architectures (not shown) included within storage system 12. Storage device 16 may include but is not limited to: a hard disk drive; a tape drive; an optical drive; a RAID device; a random access memory (RAM); a read-only memory (ROM); and all forms of flash memory storage devices. Additionally/alternatively, some portions of the instruction sets and subroutines of ransomware detection process 10 may be stored on storage devices (and/or executed by processors and memory architectures) that are external to storage system 12.

Network 14 may be connected to one or more secondary networks (e.g., network 18), examples of which may include but are not limited to: a local area network; a wide area network; or an intranet, for example.

Various IO requests (e.g. IO request 20) may be sent from client applications 22, 24, 26, 28 to storage system 12. Examples of IO request 20 may include but are not limited to data write requests (e.g., a request that content be written to storage system 12) and data read requests (e.g., a request that content be read from storage system 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID devices; random access memories (RAM); read-only memories (ROM), and all forms of flash memory storage devices. Examples of client electronic devices 38, 40, 42, 44 may include, but are not limited to, personal computer 38, laptop computer 40, smartphone 42, notebook computer 44, a server (not shown), a data-enabled, cellular telephone (not shown), and a dedicated network device (not shown).

Users 46, 48, 50, 52 may access storage system 12 directly through network 14 or through secondary network 18. Further, storage system 12 may be connected to network 14 through secondary network 18, as illustrated with link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (e.g., WAP) 58, which is shown directly coupled to network 14. WAP 58 may be, for example, an IEEE 802.11a, 802.11b, 802.11g, 802.11n, Wi-Fi, and/or Bluetooth device that is capable of establishing wireless communication channel 56 between laptop computer 40 and WAP 58. Smartphone 42 is shown wirelessly coupled to network 14 via wireless communication channel 60 established between smartphone 42 and cellular network/bridge 62, which is shown directly coupled to network 14.

Client electronic devices 38, 40, 42, 44 may each execute an operating system, examples of which may include but are not limited to Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

In some implementations, as will be discussed below in greater detail, a ransomware detection process, such as ransomware detection process 10 of FIG. 1, may include but is not limited to, processing a plurality of operations on a storage object within a file storage system at a file level. The plurality of operations are monitored for at least a threshold number of file modification operations within the file storage system. In response to monitoring the at least a threshold number of file modification operations within the file storage system, file modification information associated with the at least a threshold number of file modification operations is provided to a block level of the file storage system. A potential ransomware attack on the file storage system is identified, at the block level, based upon, at least in part, the file modification information provided from the file level.

For example purposes only, storage system 12 will be described as being a network-based storage system that includes a plurality of electro-mechanical backend storage devices. However, this is for example purposes only and is not intended to be a limitation of this disclosure, as other configurations are possible and are considered to be within the scope of this disclosure.

Figure 2:
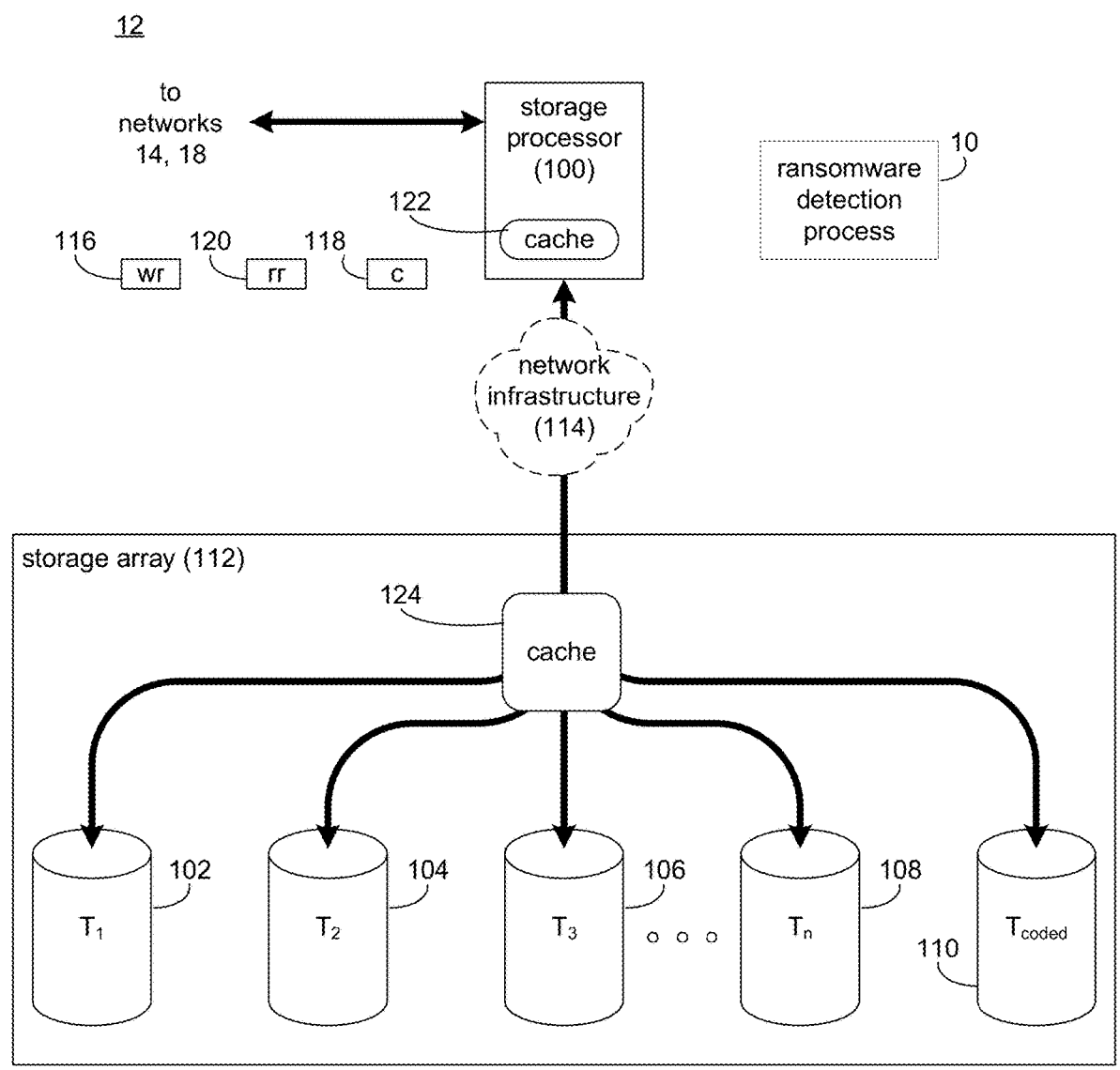
FIG. 2 is an example diagrammatic view of the storage system of FIG. 1 according to one or more example implementations of the disclosure.
Figure 3:
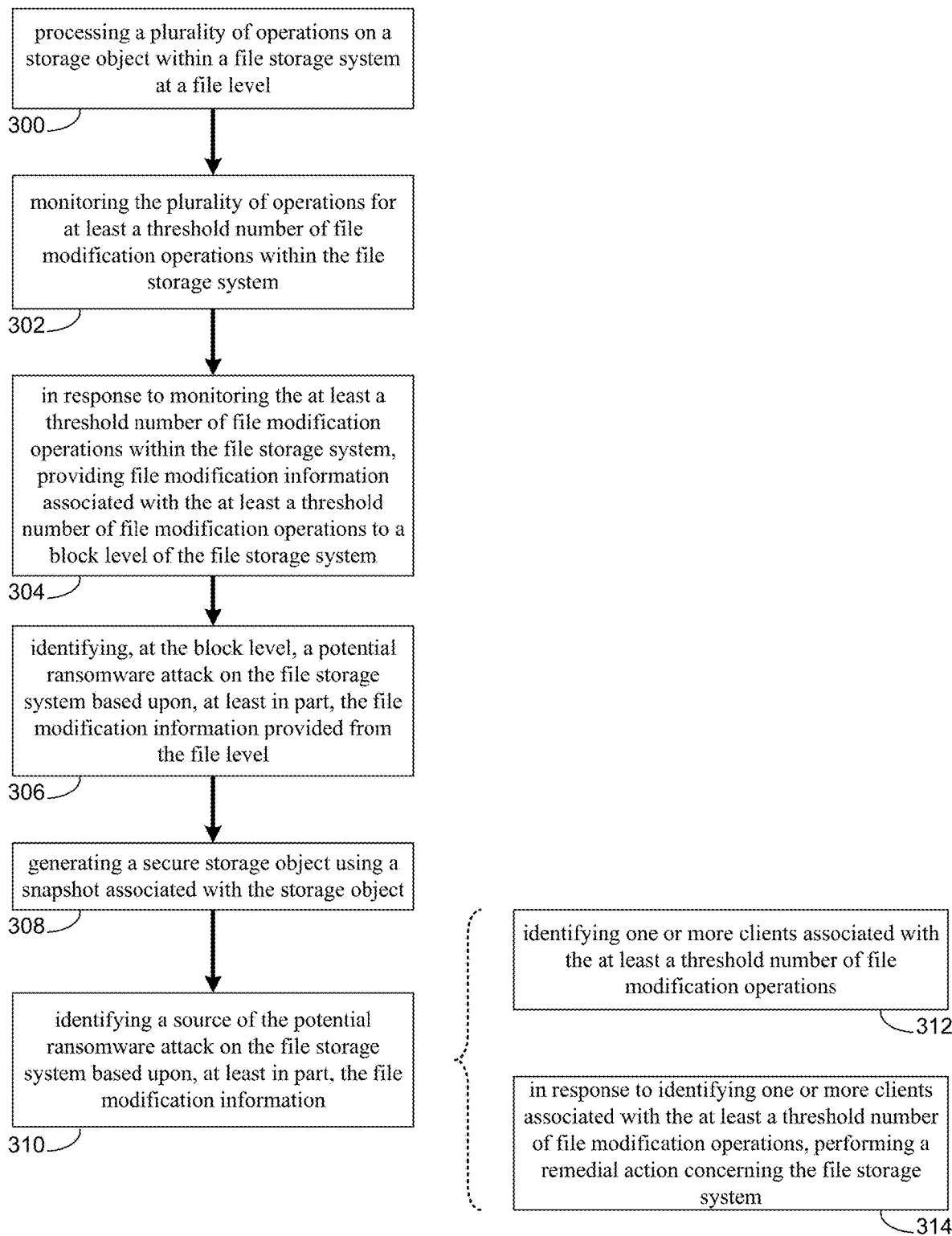
FIG. 3 is an example flowchart of ransomware detection process according to one or more example implementations of the disclosure.

The Storage System:

Referring also to FIG. 2, storage system 12 may include storage processor 100 and a plurality of storage targets T 1-n (e.g., storage targets 102, 104, 106, 108). Storage targets 102, 104, 106, 108 may be configured to provide various levels of performance and/or high availability. For example, one or more of storage targets 102, 104, 106, 108 may be configured as a RAID 0 array, in which data is striped across storage targets. By striping data across a plurality of storage targets, improved performance may be realized. However, RAID 0 arrays do not provide a level of high availability. Accordingly, one or more of storage targets 102, 104, 106, 108 may be configured as a RAID 1 array, in which data is mirrored between storage targets. By mirroring data between storage targets, a level of high availability is achieved as multiple copies of the data are stored within storage system 12.

While storage targets 102, 104, 106, 108 are discussed above as being configured in a RAID 0 or RAID 1 array, this is for example purposes only and is not intended to be a limitation of this disclosure, as other configurations are possible. For example, storage targets 102, 104, 106, 108 may be configured as a RAID 3, RAID 4, RAID 5 or RAID 6 array.

While in this particular example, storage system 12 is shown to include four storage targets (e.g. storage targets 102, 104, 106, 108), this is for example purposes only and is not intended to be a limitation of this disclosure. Specifically, the actual number of storage targets may be increased or decreased depending upon e.g., the level of redundancy/performance/capacity required.

Storage system 12 may also include one or more coded targets 110. As is known in the art, a coded target may be used to store coded data that may allow for the regeneration of data lost/corrupted on one or more of storage targets 102, 104, 106, 108. An example of such a coded target may include but is not limited to a hard disk drive that is used to store parity data within a RAID array.

While in this particular example, storage system 12 is shown to include one coded target (e.g., coded target 110), this is for example purposes only and is not intended to be a limitation of this disclosure. Specifically, the actual number of coded targets may be increased or decreased depending upon e.g. the level of redundancy/performance/capacity required.

Examples of storage targets 102, 104, 106, 108 and coded target 110 may include one or more electro-mechanical hard disk drives and/or solid-state/flash devices, wherein a combination of storage targets 102, 104, 106, 108 and coded target 110 and processing/control systems (not shown) may form storage array 112.

The manner in which storage system 12 is implemented may vary depending upon e.g. the level of redundancy/performance/capacity required. For example, storage system 12 may be a RAID device in which storage processor 100 is a RAID controller card and storage targets 102, 104, 106, 108 and/or coded target 110 are individual "hot-swappable" hard disk drives. Another example of such a RAID device may include but is not limited to an NAS device. Alternatively, storage system 12 may be configured as a SAN, in which storage processor 100 may be e.g., a server computer and each of storage targets 102, 104, 106, 108 and/or coded target 110 may be a RAID device and/or computer-based hard disk drives. Further still, one or more of storage targets 102, 104, 106, 108 and/or coded target 110 may be a SAN.

In the event that storage system 12 is configured as a SAN, the various components of storage system 12 (e.g. storage processor 100, storage targets 102, 104, 106, 108, and coded target 110) may be coupled using network infrastructure 114, examples of which may include but are not limited to an Ethernet (e.g., Layer 2 or Layer 3) network, a fiber channel network, an InfiniBand network, or any other circuit switched/packet switched network.

Storage system 12 may execute all or a portion of ransomware detection process 10. The instruction sets and subroutines of ransomware detection process 10, which may be stored on a storage device (e.g., storage device 16) coupled to storage processor 100, may be executed by one or more processors (not shown) and one or more memory architectures (not shown) included within storage processor 100. Storage device 16 may include but is not limited to: a hard disk drive; a tape drive; an optical drive; a RAID device; a random access memory (RAM); a read-only memory (ROM); and all forms of flash memory storage devices. As discussed above, some portions of the instruction sets and subroutines of ransomware detection process 10 may be stored on storage devices (and/or executed by processors and memory architectures) that are external to storage system 12.

As discussed above, various IO requests (e.g. IO request 20) may be generated. For example, these IO requests may be sent from client applications 22, 24, 26, 28 to storage system 12. Additionally/alternatively and when storage processor 100 is configured as an application server, these IO requests may be internally generated within storage processor 100. Examples of IO request 20 may include but are not limited to data write request 116 (e.g., a request that content 118 be written to storage system 12) and data read request 120 (i.e. a request that content 118 be read from storage system 12).

During operation of storage processor 100, content 118 to be written to storage system 12 may be processed by storage processor 100. Additionally/alternatively and when storage processor 100 is configured as an application server, content 118 to be written to storage system 12 may be internally generated by storage processor 100.

Storage processor 100 may include frontend cache memory system 122. Examples of frontend cache memory system 122 may include but are not limited to a volatile, solid-state, cache memory system (e.g., a dynamic RAM cache memory system) and/or a non-volatile, solid-state, cache memory system (e.g., a flash-based, cache memory system).

Storage processor 100 may initially store content 118 within frontend cache memory system 122. Depending upon the manner in which frontend cache memory system 122 is configured, storage processor 100 may immediately write content 118 to storage array 112 (if frontend cache memory system 122 is configured as a write-through cache) or may subsequently write content 118 to storage array 112 (if frontend cache memory system 122 is configured as a write-back cache).

Storage array 112 may include backend cache memory system 124. Examples of backend cache memory system 124 may include but are not limited to a volatile, solid-state, cache memory system (e.g., a dynamic RAM cache memory system) and/or a non-volatile, solid-state, cache memory system (e.g., a flash-based, cache memory system). During operation of storage array 112, content 118 to be written to storage array 112 may be received from storage processor 100. Storage array 112 may initially store content 118 within backend cache memory system 124 prior to being stored on e.g. one or more of storage targets 102, 104, 106, 108, and coded target 110.

As discussed above, the instruction sets and subroutines of ransomware detection process 10, which may be stored on storage device 16 included within storage system 12, may be executed by one or more processors (not shown) and one or more memory architectures (not shown) included within storage system 12. Accordingly, in addition to being executed on storage processor 100, some or all of the instruction sets and subroutines of ransomware detection process 10 may be executed by one or more processors (not shown) and one or more memory architectures (not shown) included within storage array 112.

Further and as discussed above, during the operation of storage array 112, content (e.g., content 118) to be written to storage array 112 may be received from storage processor 100 and initially stored within backend cache memory system 124 prior to being stored on e.g. one or more of storage targets 102, 104, 106, 108, 110. Accordingly, during use of storage array 112, backend cache memory system 124 may be populated (e.g., warmed) and, therefore, subsequent read requests may be satisfied by backend cache memory system 124 (e.g., if the content requested in the read request is present within backend cache memory system 124), thus avoiding the need to obtain the content from storage targets 102, 104, 106, 108, 110 (which would typically be slower).

The Ransomware Detection Process:

Referring also to the examples of FIGS. 3-6 and in some implementations, ransomware detection process 10 may process 300 a plurality of operations on a storage object within a file storage system at a file level. The plurality of operations are monitored 302 for at least a threshold number of file modification operations within the file storage system. In response to monitoring the at least a threshold number of file modification operations within the file storage system, file modification information associated with the at least a threshold number of file modification operations is provided 304 to a block level of the file storage system. A potential ransomware attack on the file storage system is identified 306, at the block level, based upon, at least in part, the file modification information provided from the file level.

As will be discussed in greater detail below, implementations of the present disclosure may allow for enhanced block level ransomware detection by monitoring for file modification operations at the file level that are indicative of ransomware attacks. Ransomware attacks are a primary security threat in today's world and are becoming more and more prevalent. Accurate detection is crucial, since a false negative is a failure to detect an ongoing ransomware attack, while a false positive indicates a false alarm which may cause users of a storage system to halt normal business operations and start a lengthy investigation process. There are different ransomware variants utilizing particular modes of operation (threats, tactics and procedures) which makes detecting a ransomware attack in general (i.e., a binary classification) more challenging, and detection of a specific type of attack (i.e., multi-class classification) even more challenging. Conventional approaches are focused on detection of ransomware attacks on a host, where the attack is occurring (i.e., where the ransomware is being executed). However, in an enterprise setting, the storage is typically separate from the host, using a file or block storage device or storage system. Detection of ransomware attacks on the storage system as opposed to the host poses a unique challenge since the storage system does not have direct access to information about the execution of the ransomware attack.

Conventional approaches detect ransomware attacks with a block level analysis but are unable to assess the impact of input/output (IO) operations, particularly file modification operations, at the file level. As such, implementations of the present disclosure allow for the real-time monitoring, detection, and prevention of ransomware attacks by identifying ransomware attacks at the file level and by providing this information to block level-based ransomware detection systems. In this manner, ransomware detection process 10 is able to use file level operation information, particularly information associated with certain types of file modification operations (e.g., file renaming operations and file deletion operations), to enhance block level-based ransomware detection and prevention.

In some implementations, ransomware detection process 10 may process 300 a plurality of operations on a storage object within a file storage system at a file level. A file storage system is a hierarchical storage methodology used to organize and store data on a storage device and/or on a network-attached storage (NAS) device. In some implementations, the file storage system is a Software-Defined Network Attached Storage (SDNAS) system. A SDNAS is system that provides file-based data storage services to devices on a network where the configuration of the system is software defined. For example, the configuration of the network-attached storage includes policy-based provisioning and management of data storage independent of the underlying hardware. This may include a form of storage virtualization to separate the storage hardware from the software that manages it. In some implementations, SDNAS may provide policy management for features such as data deduplication, replication, thin provisioning, snapshots, and/or data backup.

Figure 4:
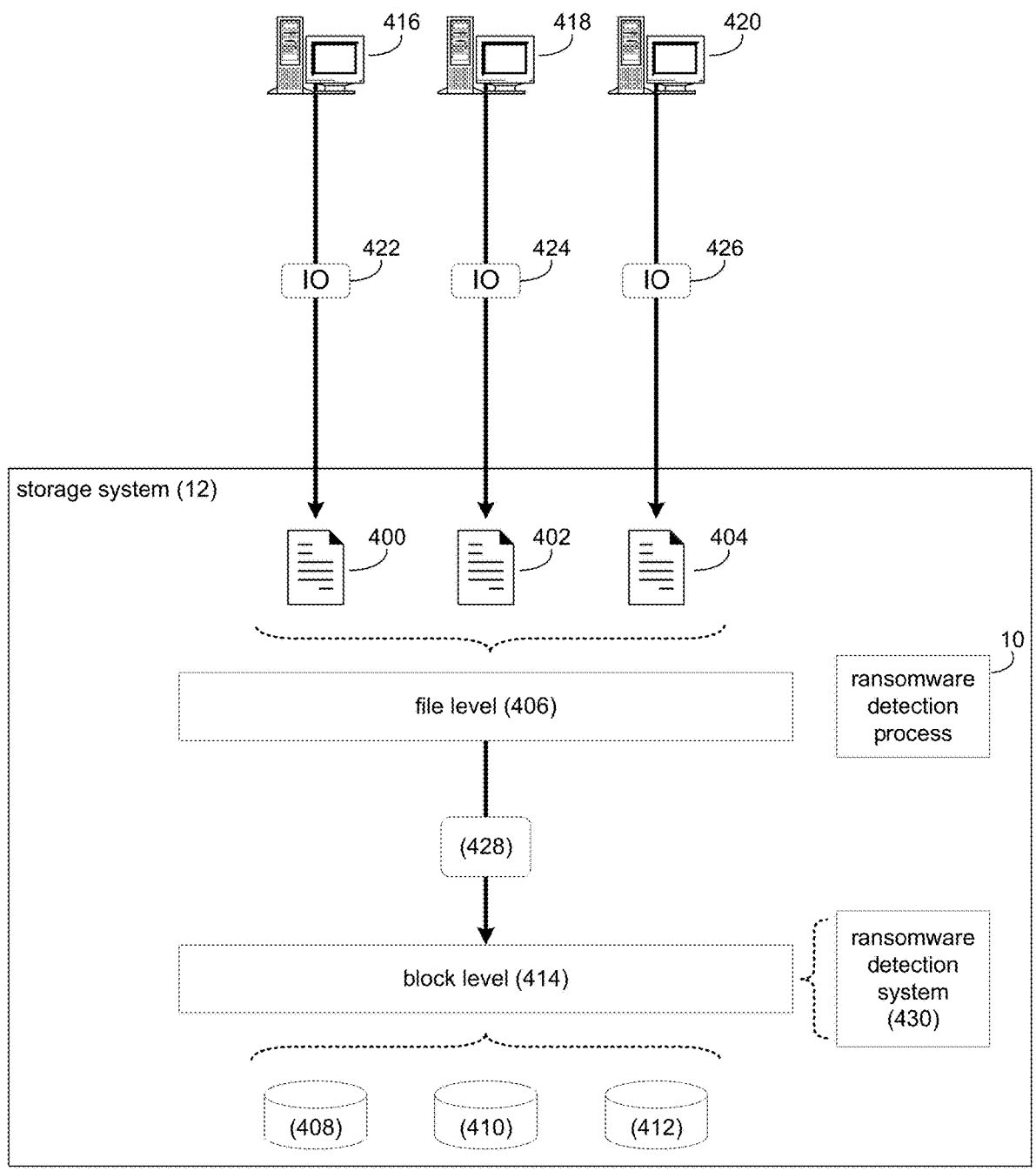
FIGS. 4-6 are example diagrammatic views of the storage system of FIG. 1 according to various example implementations of the disclosure.

Referring also to FIG. 4 and in some implementations, a storage system (e.g., storage system 12) may include file storage objects or files (e.g., files 400, 402, 404) provided by a file level of storage system 12 (e.g., file level 406) and block storage objects (e.g., block storage objects 408, 410, 412) provided by a block level of storage system 12 (e.g., block level 414). A block storage object is a block or chunk of storage that can be accessed by various operating systems. As shown in FIG. 4, a plurality of client devices (e.g., client devices 416, 418, 420) may provide or submit a plurality of IO operations (e.g., IO operations 422, 424, 426) for execution on the storage system (e.g., storage system 12). Specifically, these IO operations (e.g., IO operations 422, 424, 426) may include operations to be performed on or using various files (e.g., files 400, 402, 404) of the file level (e.g., file level 406) of the storage system. Accordingly, ransomware detection process 10 may process 300 these operations (e.g., IO operations 422, 424, 426) on a storage object (e.g., files 400, 402, 404) within a file storage system at a file level. As will be discussed in greater detail below, the plurality of operations (e.g., IO operations 422, 424, 426) may include read IO operations, write IO operations, file modification operations (e.g., file creation operations, file deletion operations, file relocation operations, file merge operations, file renaming operations, etc.), and other various types of operations within the scope of the present disclosure. As these operations may or may not be indicative or associated with a ransomware attack, ransomware detection process 10 may process 300 these operations and monitor for particular patterns or anomalous behavior at the file level.

In some implementations, ransomware detection process 10 may monitor 302 the plurality of operations for at least a threshold number of file modification operations within the file storage system. Monitoring 302 the plurality of operations includes determining the type of operation being executed on each file. In some implementations, monitoring 302 the plurality of operations includes maintaining counters for particular types of operations. For example and in some implementations, ransomware detection process 10 may monitor 302 various types of operations being processed. In one example, ransomware detection process 10 may monitor 302 for file modification operations by maintaining counter (s) for a particular window of time (e.g., the number of file modification operations within one hour).

In some implementations, the file modification operations include at least one of: a file rename operation and a file deletion operation. For example, during a ransomware attack, files are typically removed from a storage system or encrypted within the storage system in a manner that introduces a new level of access control over the data. In one example, an attacker may execute a ransomware attack by obtaining access to a particular storage device or file, reading the file, encrypting the file into a temporary file, deleting the original file, and renaming the encrypted file to be the original one. Accordingly, a ransomware attack may be identified using these file modification operations. In some implementations, ransomware detection process 10 may compare the number of file modification operations to a predefined threshold number of file modification operations. For example, ransomware detection process 10 may receive (e.g., from a user interface) a selection of a threshold number of file modification operations for particular types of file modification operations (e.g., one threshold for file rename operations, another threshold for file deletion operations, etc.).

In some implementations, ransomware detection process 10 may monitor 302 a threshold number of file modification operations including a predefined sequence of file modification operations. For example, ransomware detection process 10 may monitor 302 for a predefined number of sequence of file modification operations (e.g., an encryption operation followed by a deletion operation followed by a renaming operation) on a threshold number of files. In this manner, ransomware detection process 10 may monitor 302 the plurality of operations for particular types and sequences of file modification operations on the file level of a storage system.

In some implementations, ransomware detection process 10 may, in response to monitoring the at least a threshold number of file modification operations within the file storage system, provide 304 file modification information associated with the at least a threshold number of file modification operations to a block level of the file storage system. For example, suppose ransomware detection process 10 monitors 302 a least a threshold number of file modification operations being performed on files 400, 402 that are associated with a particular volume (e.g., block storage object 408). In this example, ransomware detection process 10 may generate or otherwise store file modification information (e.g., file modification information 428) associated with the at least a threshold number of file modifications. For example, file modification information 428 may include the number of file modification operations monitored for a particular file and/or block storage object associated with one or more files, the block storage object associated with the particular file or files, the timing of the file modification operations, and/or information concerning the origin of the file modification operations. In some implementations, ransomware detection process 10 may provide 304 file modification information 428 from file level 406 to block level 414 by asynchronously or periodically "pushing" file modification information 428 to block level 414 or asynchronously or periodically "polling" file modification information 428 from file level 406. In one example, block level 414 may query for a specific volume (e.g., block storage object 408) used by file level 406 for file modification information using a REST API or other request protocol.

In some implementations, ransomware detection process 10 may identify 306, at the block level, a potential ransomware attack on the file storage system based upon, at least in part, the file modification information provided from the file level. For example and as discussed above, a ransomware attack may include a particular patterns or sequences of file modification operations at the file level. As such, ransomware detection process 10 may, using a ransomware detection system (e.g., ransomware detection system 430), compare the file modification information (e.g., file modification information 428) to a plurality of known ransomware file modification patterns in combination with block level operation information to determine, at the block level, a potential ransomware attack on the file storage system. For example, the ransomware detection system (e.g., ransomware detection system 430) includes any software technique configured to monitor and detect ransomware attacks at the block level. In some implementations, ransomware detection process 10 may identify 306 a potential ransomware attack in response to identifying a significant variation in the statistics associated with the file storage system. For example, suppose ransomware detection process 10 receives file modification information 428 indicative of significant numbers of file renaming and file deletion operations. In this example, ransomware detection process 10 may compare these statistics to any number of or combination of thresholds to identify a potential ransomware attack. For example, these thresholds may be pre-defined, user-defined, and/or automatically defined by ransomware detection process 10. In some implementations, ransomware detection process 10 may combine file modification information 428 as additional context to any block modification information or other statistics processed by ransomware detection system 430. Accordingly, ransomware detection process 10 can leverage the file modification information in addition to what it is already tracking in order to identify 306 a potential ransomware attack.

Figure 5:
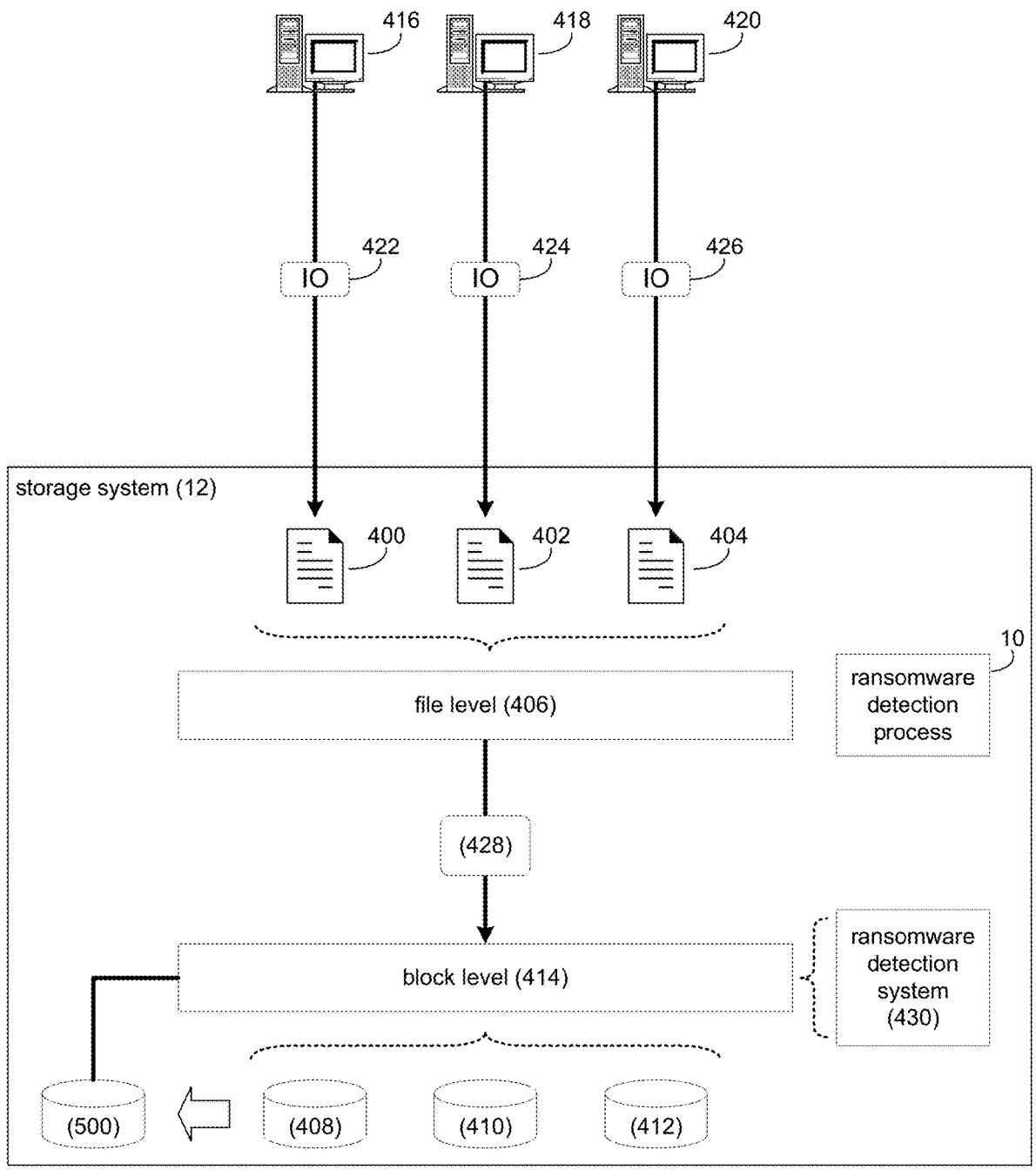
Figure 6:
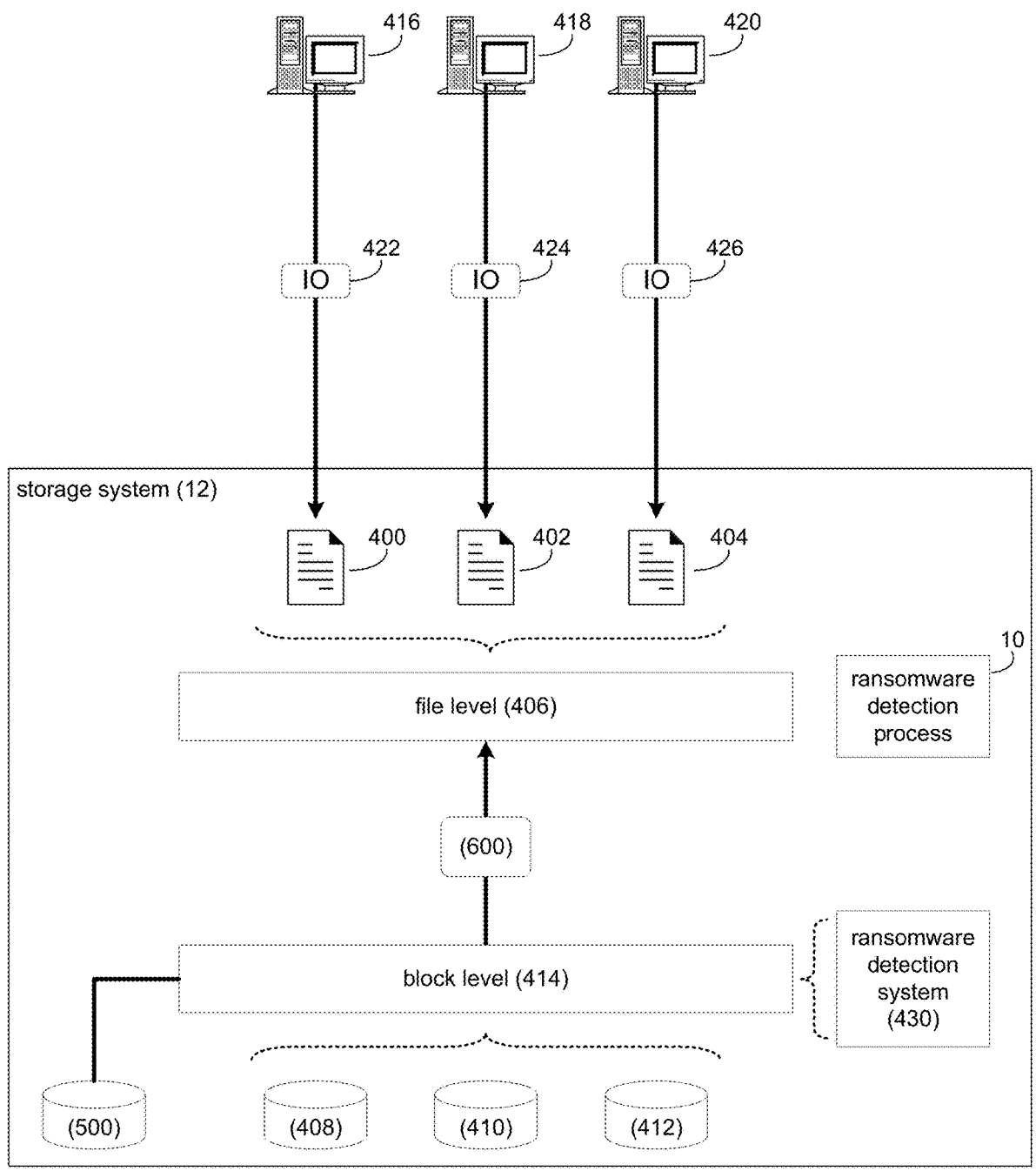

In some implementations, ransomware detection process 10 may generate 308 a secure storage object using a snapshot associated with the storage object. For example, once ransomware detection process 10 identifies 306 a potential ransomware attack, ransomware detection process 10 generates a "pre-ransomware" storage object. Referring also to FIG. 5 and in one example, when the block level (e.g., ransomware detection system 430) identifies 306 a potential ransomware attack, it can alert the file level (e.g., the NAS server) that is using the particular storage object (e.g., volume) and generate 308 a secure storage object (e.g., snapshot volume 500) that could be used by a user to mount a pre-ransomware snap file system. However, because the secure storage object (e.g., snapshot volume 500) may be created outside of the file system synchronization, some inflight metadata may be left in a transaction log. Accordingly, the block level generates 308 snap volume 500 as a writeable "snap" or snapshot of the pre-ransomware snapshot volume and provide this to the file system. Referring again to FIG. 5, suppose ransomware detection process 10 identifies 306 a potential ransomware attack associated with storage system 12. For example, suppose ransomware detection process 10 determines that storage object 408 is the target of a ransomware attack. In this example, ransomware detection process 10 generates 308 a secure storage object (e.g., secure storage object 500).

In some implementations, ransomware detection process 10 may identify 310 a source of the potential ransomware attack on the file storage system based upon, at least in part, the file modification information. For example and referring also to FIG. 6, when an alert of a potential ransomware attack (e.g., alert 600) is sent (via e.g., REST API) to the file level (e.g., SDNAS NAS server), a user may desire to identify the source of the attacker (e.g., in order to perform a preventative or remedial action). In some implementations, when the alert (e.g., alert 600) is sent, the volume under attack is specified by the block layer and the file level (e.g., file level 406) can map it with a file system identifier. For example, a file system identifier may include an FSID (filesystem ID). An FSID is an identifier that references clients (e.g., NFS/CIFS clients) accessing the volume under attack. Referring again to FIG. 6, suppose that ransomware detection process 10 sends an alert (e.g., alert 600) from block level 414 to file level 406. In this example, ransomware detection process 10 may use a file system identifier to track access to the resources of the storage system indicative of a ransomware attack.

In some implementations, identifying 310 the source of the potential ransomware attack may include identifying 312 one or more clients associated with the at least a threshold number of file modification operations. For example, ransomware detection process 10 may track all the NFS/CIFS clients using this file system identifier to identify which clients generate a lot of data with high entropy and a large amount of file modification operations (e.g., file renaming and file deletion operations). In one example, ransomware detection process 10 may compare the number of file modification operations and/or the amount of data with entropy to identify 310 the source of the potential ransomware attack. Referring again to FIG. 6, suppose ransomware detection process 10 identifies 310 a client (e.g., client 416) with at least a threshold number of file modification operations for file 400. In this example, ransomware detection process 10 may identify 310 client 400 as the source of the potential ransomware attack. In some implementations, ransomware detection process 10 may identify 312 the one or more clients by identifying at least a threshold number of file modification operations over a predefined period of time. For example, ransomware detection process 10 may define a predefined period of time for monitoring for at least a threshold number of file modification operations.

In some implementations, in response to identifying one or more clients associated with the at least a threshold number of file modification operations, ransomware detection process 10 may perform 314 a remedial action concerning the file storage system. A remedial action concerning the file storage system includes closing a network connection with the identified one or more clients, unmounting the file system, generating one or more alerts or notifications to other individuals or entities associated with the file storage system (e.g., a storage system administrator), and/or limiting bandwidth or other computing resources available to the one or more clients. In this manner, ransomware detection process 10 limits the impact or veracity of a ransomware attack by performing any number of, or combination of, remedial actions within the scope of the present disclosure.

For instance and continuing with the above example, suppose that ransomware detection process 10 identifies 310 client 416 as the source of the potential ransomware attack. In this example, ransomware detection process 10 may after some predefined period of time, generate an alert to a storage system administrator and close the network connection with that client and reject any new connection from those clients. In another example, ransomware detection process 10 may unmount the file system once the attacker is identified. However, it will be appreciated that these are for example purposes only and that various remedial actions may be performed within the scope of the present disclosure.

General:

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to implementations of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various implementations of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular implementations only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various implementations with various modifications as are suited to the particular use contemplated.

A number of implementations have been described. Having thus described the disclosure of the present application in detail and by reference to implementations thereof, it will be apparent that modifications and variations are possible without departing from the scope of the disclosure defined in the appended claims.

What is claimed is:

1. A computer-implemented method, executed on a computing device, comprising:
    processing a plurality of operations on a storage object within a file storage system at a file level;
    monitoring the plurality of operations for at least a threshold number of file modification operations within the file storage system;
    in response to monitoring the at least a threshold number of file modification operations within the file storage system, providing file modification information associated with the at least a threshold number of file modification operations to a ransomware detection system deployed on a block level of the file storage system, wherein the file modification operations include a number of file rename operations and a number of file deletion operations; and
    identifying, at the block level, a potential ransomware attack on the file storage system using the ransomware detection system deployed on the block level based upon, at least in part, the file modification information provided from the file level.

2. The computer-implemented method of claim 1, wherein the file storage system is a Software-Defined Network Attached Storage (SDNAS) system.

3. The computer-implemented method of claim 1, further comprising:
    generating a secure storage object using a snapshot associated with the storage object.

4. The computer-implemented method of claim 1, further comprising:
identifying a source of the potential ransomware attack on the file storage system based upon, at least in part, the file modification information.

5. The computer-implemented method of claim 4, wherein identifying the source of the potential ransomware attack includes identifying one or more clients associated with the at least a threshold number of file modification operations.

6. The computer-implemented method of claim 5, further comprising:
in response to identifying one or more clients associated with the at least a threshold number of file modification operations, performing a remedial action concerning the file storage system.

7. A computer program product residing on a non-transitory computer readable medium having a plurality of instructions stored thereon which, when executed by a processor, cause the processor to perform operations comprising:
processing a plurality of operations on a storage object within a file storage system at a file level;
monitoring the plurality of operations for at least a threshold number of file modification operations within the file storage system;
in response to monitoring the at least a threshold number of file modification operations within the file storage system, providing file modification information associated with the at least a threshold number of file modification operations to a ransomware detection system deployed on a block level of the file storage system, wherein the file modification operations include a number of file rename operations and a number of file deletion operations; and
identifying, at the block level, a potential ransomware attack on the file storage system using the ransomware detection system deployed on the block level based upon, at least in part, the file modification information provided from the file level.

8. The computer program product of claim 7, wherein the file storage system is a Software-Defined Network Attached Storage (SDNAS) system.

9. The computer program product of claim 7, wherein the operations further comprise:
generating a secure storage object using a snapshot associated with the storage object.

10. The computer program product of claim 7, wherein the operations further comprise:
identifying a source of the potential ransomware attack on the file storage system based upon, at least in part, the file modification information.

11. The computer program product of claim 10, wherein identifying the source of the potential ransomware attack includes identifying one or more clients associated with the at least a threshold number of file modification operations.

12. The computer program product of claim 11, wherein the operations further comprise:
in response to identifying one or more clients associated with the at least a threshold number of file modification operations, performing a remedial action concerning the file storage system.

13. A computing system comprising:
a memory; and
a processor configured to process a plurality of operations on a storage object within a file storage system at a file level, wherein the processor is configured to monitor the plurality of operations for at least a threshold number of file modification operations within the file storage system, wherein the processor is further configured to, in response to monitoring the at least a threshold number of file modification operations within the file storage system, provide file modification information associated with the at least a threshold number of file modification operations to a ransomware detection system deployed on a block level of the file storage system, wherein the file modification operations include a number of file rename operations and a number of file deletion operations, and wherein the processor is further configured to identify, at the block level, a potential ransomware attack on the file storage system using the ransomware detection system deployed on the block level based upon, at least in part, the file modification information provided from the file level.

14. The computing system of claim 13, wherein the file storage system is a Software-Defined Network Attached Storage (SDNAS) system.

15. The computing system of claim 13, wherein the processor is further configured to:
generate a secure storage object using a snapshot associated with the storage object.

16. The computing system of claim 15, wherein the operations further comprise:
identify a source of the potential ransomware attack on the file storage system based upon, at least in part, the file modification information.

17. The computing system of claim 16, wherein identifying the source of the potential ransomware attack includes identifying one or more clients associated with the at least a threshold number of file modification operations.

\* \* \* \* \*